US007370097B2

(12) United States Patent
Hashimoto

(10) Patent No.: US 7,370,097 B2
(45) Date of Patent: May 6, 2008

(54) NETWORK MANAGEMENT PROGRAM, NETWORK MANAGEMENT SYSTEM AND NETWORK MANAGEMENT APPARATUS

(75) Inventor: Yasuhiro Hashimoto, Osaka (JP)

(73) Assignee: Minolta Co., Ltd., Osaka (JP)

( * ) Notice: Subject to any disclaimer, the term of this patent is extended or adjusted under 35 U.S.C. 154(b) by 953 days.

(21) Appl. No.: 10/463,609

(22) Filed: Jun. 18, 2003

(65) Prior Publication Data
US 2004/0003076 A1 Jan. 1, 2004

(30) Foreign Application Priority Data
Jun. 26, 2002 (JP) ............................. 2002-185752

(51) Int. Cl.
G06F 15/173 (2006.01)
(52) U.S. Cl. ...................................... 709/223
(58) Field of Classification Search ................ 709/220, 709/221, 222, 243, 223, 226; 399/8; 455/453; 707/8, 203
See application file for complete search history.

(56) References Cited

U.S. PATENT DOCUMENTS

| 6,343,320 | B1 * | 1/2002 | Fairchild et al. ............. 709/224 |
| 6,414,947 | B1 * | 7/2002 | Legg et al. .................. 370/331 |
| 6,611,863 | B1 * | 8/2003 | Banginwar ................... 709/220 |
| 6,643,704 | B1 * | 11/2003 | Timms et al. ................ 709/239 |
| 6,662,222 | B2 * | 12/2003 | Ishii et al. ................... 709/224 |
| 6,671,801 | B1 * | 12/2003 | Prakash ........................ 713/1 |
| 6,687,748 | B1 * | 2/2004 | Zhang et al. ................. 709/223 |
| 6,925,079 | B2 * | 8/2005 | Matsukawa ................... 370/389 |
| 6,948,003 | B1 * | 9/2005 | Newman et al. ............. 709/250 |
| 6,978,459 | B1 * | 12/2005 | Dennis et al. ............... 718/100 |
| 7,016,060 | B1 * | 3/2006 | Carney et al. .............. 358/1.15 |
| 7,099,319 | B2 * | 8/2006 | Boden et al. ................. 370/389 |
| 7,213,068 | B1 * | 5/2007 | Kohli et al. ................. 709/225 |
| 2002/0048036 | A1 * | 4/2002 | Nakagawa et al. ......... 358/1.14 |
| 2002/0099806 | A1 * | 7/2002 | Balsamo et al. ............ 709/223 |
| 2002/0141762 | A1 | 10/2002 | Doui et al. |

(Continued)

FOREIGN PATENT DOCUMENTS

JP 11-296467 10/1999

(Continued)

OTHER PUBLICATIONS

Scott Kirkwood, "Network Management with Overlapping IP address Ranges", Sys Admin and The Perl Journal CD-ROM Version 12.0.*

(Continued)

Primary Examiner—Krisna Lim
(74) Attorney, Agent, or Firm—Morrison & Foerster LLP

(57) ABSTRACT

A network management program is executed in a managing device for managing network which includes multiple devices to be managed and plural managing devices. The network management program comprises computer instructions for exchanging management information between said plural managing devices, judging in accordance with said exchanged management information whether said plural managing devices are performing duplicative management with respect to the same managed device or not, and making only one of said plural managing devices manage said device duplicatively managed. The network management servers (managing devices) comprising computers operates in accordance with the network management program installed in memory on both computers so as to prevent dupulicative management of the multiple devices to be managed belonging to the network.

24 Claims, 3 Drawing Sheets

U.S. PATENT DOCUMENTS

| | | | |
|---|---|---|---|
| 2003/0009546 A1* | 1/2003 | Benfield et al. | 709/223 |
| 2003/0041167 A1* | 2/2003 | French et al. | 709/238 |
| 2003/0041238 A1* | 2/2003 | French et al. | 713/153 |
| 2003/0069958 A1* | 4/2003 | Jalava | 709/223 |

FOREIGN PATENT DOCUMENTS

| | | |
|---|---|---|
| JP | 2000-181829 | 6/2000 |
| JP | 2001-144761 | 5/2001 |
| JP | 2001-326660 | 11/2001 |

OTHER PUBLICATIONS

Japanese Notification of Grounds of Rejection mailed Dec. 25, 2007, directed to counterpart JP application No. 2002-185752.

* cited by examiner

NETWORK MANAGEMENT PROGRAM, NETWORK MANAGEMENT SYSTEM AND NETWORK MANAGEMENT APPARATUS This application is based on Japanese Patent Application No. 2002-185752 filed in Japan on Jun. 26, 2002, the entire content of which is hereby incorporated by reference.

BACKGROUND OF THE INVENTION

1. Field of the Invention

The present invention relates to a network management program, network management system and network management apparatus that manage a system in which multiple managed devices and multiple managing apparatuses that manage these managed devices are interconnected over a network.

2. Description of the Related Art

In recent years, systems in which multiple managed devices such as printers, copiers and scanners are interconnected over a network such as a LAN with multiple managing apparatuses that managing these managed devices, such as servers and personal computers, in a local area such as an office, building or factory (hereinafter 'network systems') have become increasingly popular. If such a network system is built on a small scale, it is sufficient if there is only one managing apparatus ('network management utility') on the network. However, if the network system is large in size, because it is difficult to manage all of the managed devices with one managing apparatus, multiple managing apparatuses are disposed on a single network.

In a network system in which multiple managed devices are managed by multiple managing apparatuses in this fashion, where the network, such as a LAN, is built to cover a large area (across different locations that are located at a substantial distance from one another), for example, it is difficult to determine which managing apparatus is managing which managed devices. As a result, it may become unclear which managing apparatus is managing a given managed device, or a given managed device may be subject to management by more than one managing apparatus, creating an undesirable burden on the network. Therefore, in this type of network system, in order to properly manage each managed device so as to avoid duplicative management, means that specifies a managing apparatus (a device that performs management) to manage each managed device is required.

OBJECTS AND SUMMARY

An object of the present invention is to provide an improved network management program, network management system and network management apparatus that eliminate the problems described above.

Another object of the present invention is to provide a simple and low-cost network management method that enables, in a network system in which multiple managed devices are managed by multiple managing apparatuses, proper management of each managed device without duplicative management.

These objects are achieved by providing the network management program, network management system and network management apparatus described below.

According to one aspect of the present invention, a network management program executed in a managing device for managing network which includes multiple devices to be managed and plural managing devices, said management program comprising computer instructions for: exchanging management information between said plural managing devices; judging in accordance with said exchanged management information whether said plural managing devices are performing duplicative management with respect to the same managed device or not; and making only one of said plural managing devices manage said device duplicatively managed.

According to another aspect of the present invention, a network management program executed in a managing device for managing network which includes multiple devices to be managed and plural managing devices, said management program comprising computer instructions for exchanging management information between said plural managing devices, judging in accordance with said exchanged management information whether the network management ranges of said plural managing devices overlap or not, and making only one of said plural managing devices manage said device duplicatively managed.

A network management system includes network management apparatus, said network management apparatus comprising a memory in which a network management program described above is installed, wherein the network management apparatus operates in accordance with the network management program installed in the memory.

A network management apparatus comprising a memory in which a network management program described above is installed, wherein the network management apparatus operates in accordance with the network management program installed in the memory.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

The preferred embodiments of the present invention will be described in detail below.

Figure 1:
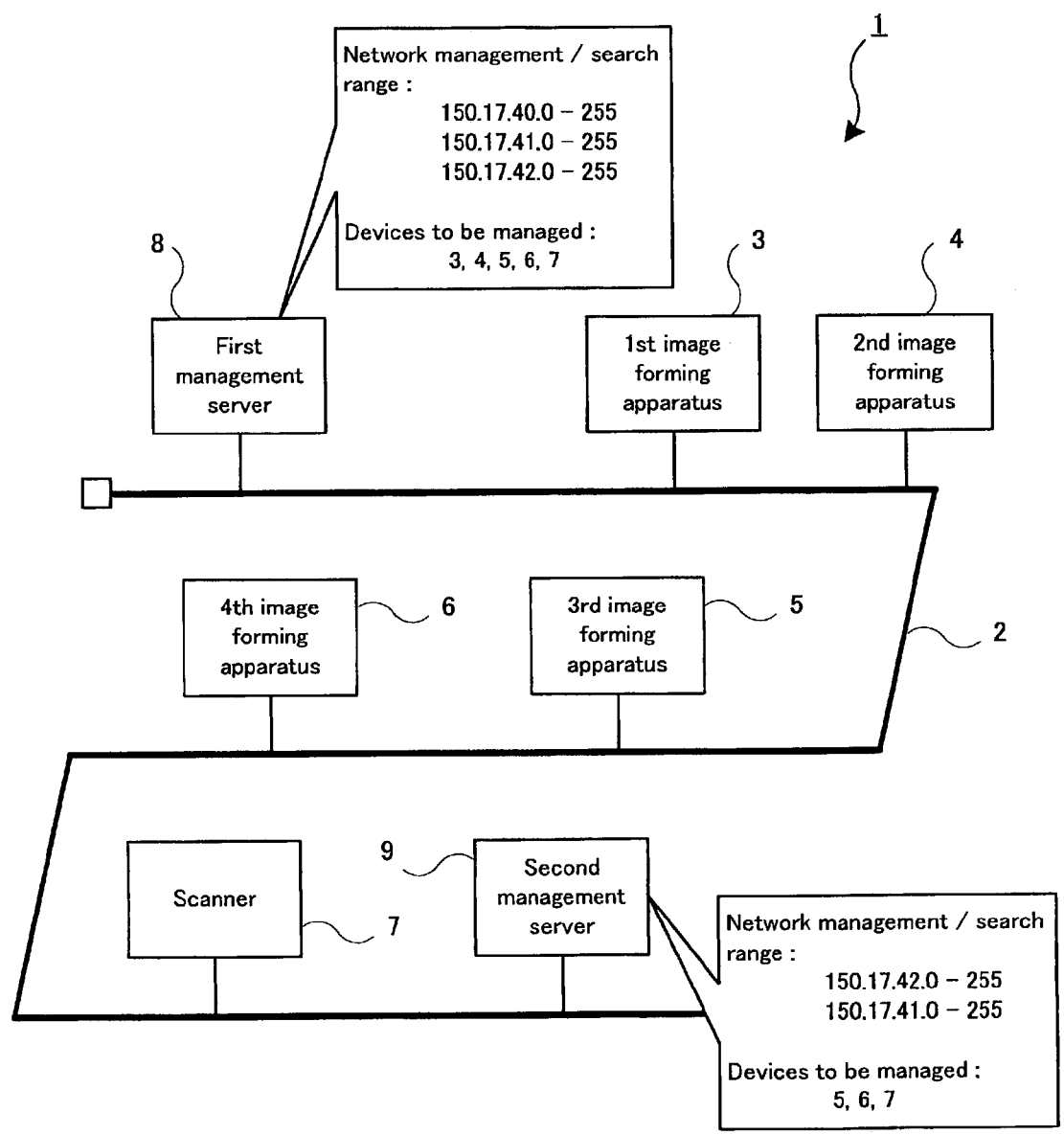
FIG. 1 is a block diagram showing the basic construction of a network system.

FIG. 1 shows the basic construction of a network system that is managed by computers using the network management program of the present invention. As shown in FIG. 1, in this network system 1, first through fourth image forming apparatuses (or multi-function peripherals) 3-6, a scanner 7 and first and second management servers 8 and 9 are connected to a network 2 that includes multiple local networks. The first through fourth image forming apparatuses 3-6 may comprise printers, copiers or facsimile machines, for example. It is furthermore acceptable if various types of information processing apparatuses such as personal computers or databases are connected to the network 2.

The management performed by the first and second management servers includes, as specific examples, collection of apparatus information in order to perform searches and show file lists regarding the image forming apparatuses and scanners on the network, apparatus function configuration, e-mail notification to the administrator when a problem occurs in an apparatus, storage of log information that includes the total number of pages printed or the number of errors for each image forming apparatus, and management of updating information regarding the firmware programs for each image forming apparatus.

The first and second management servers 8 and 9 each constitute a managing apparatus comprising a computer, and manage the various managed devices connected to the network 2. The IP addresses (Internet Protocol Addresses) for the network management ranges (or network search ranges) of the first management server 8 are (150.17.40.0-255), (150.17.41.0-255), and (150.17.42.0-255). The managed devices that can be managed by the first management server 8 are the first through fourth image forming apparatuses 3-6 and the scanner 7. On the other hand, the IP addresses for the network management ranges (or network search ranges) of the second management server 9 are (150.17.41.0-255), and (150.17.42.0-255). The managed devices that can be managed by the second management server 9 are the third and fourth image forming apparatuses 5 and 6 and the scanner 7.

The first and second management servers 8 and 9 comprising computers operate in accordance with the network management program that is installed in memory on both computers. In other words, the first and second management servers 8 and 9 function as a management system (network management system) for the network system 1. Besides being installed on the first and second management servers 8 and 9, the network management program is stored via recording onto a recording medium such as a magnetic disk or optical disk.

One version of the network management program basically causes the first and second management servers 8 and 9 to carry out the processing described below. First, various management information is transmitted and received (or exchanged) between the management servers 8 and 9. It is then determined based on the transmitted and received management information whether or not the management servers 8 and 9 are performing duplicative management with respect to a managed device (i.e., the first through fourth image forming apparatus 3-6 or the scanner 7). If the management servers 8 and 9 are performing duplicative management with respect to the same managed device, either the management server 8 or the management server 9 is caused to manage this managed device.

Another version of the network management program basically causes the first and second management servers 8 and 9 to carry out the processing described below. First, various management information is transmitted and received (or exchanged) between the management servers 8 and 9. It is then determined based on the transmitted and received management information whether or not the network management ranges (or network search ranges) of the management servers 8 and 9 overlap. If the network management ranges of the management servers 8 and 9 overlap, either the management server 8 or the management server 9 is caused to manage this overlapping network management range or any managed device belonging to this range.

The determination as to which of the management servers 8 and 9 is to be caused to manage the managed device that is subject to duplicate management as described above may be carried out according to the criteria described below, for example. In other words, the managed device may be managed by the management server 8 or 9 that is connected to the same local network as that to which the managed device is connected. It is also acceptable if the managed device is managed by the management server 8 or 9 having the earliest management start time for that managed device (or duplicate network management range). Alternatively, it is acceptable if the managed device is managed by the server 8 or 9 that has the smallest number of other managed devices that it is managing (or the smallest managed range).

The processing sequence for the managing apparatus determination routine executed by a particular management server based on the network management program will now be described below with reference to the flow chart of FIG. 2.

Figure 2:
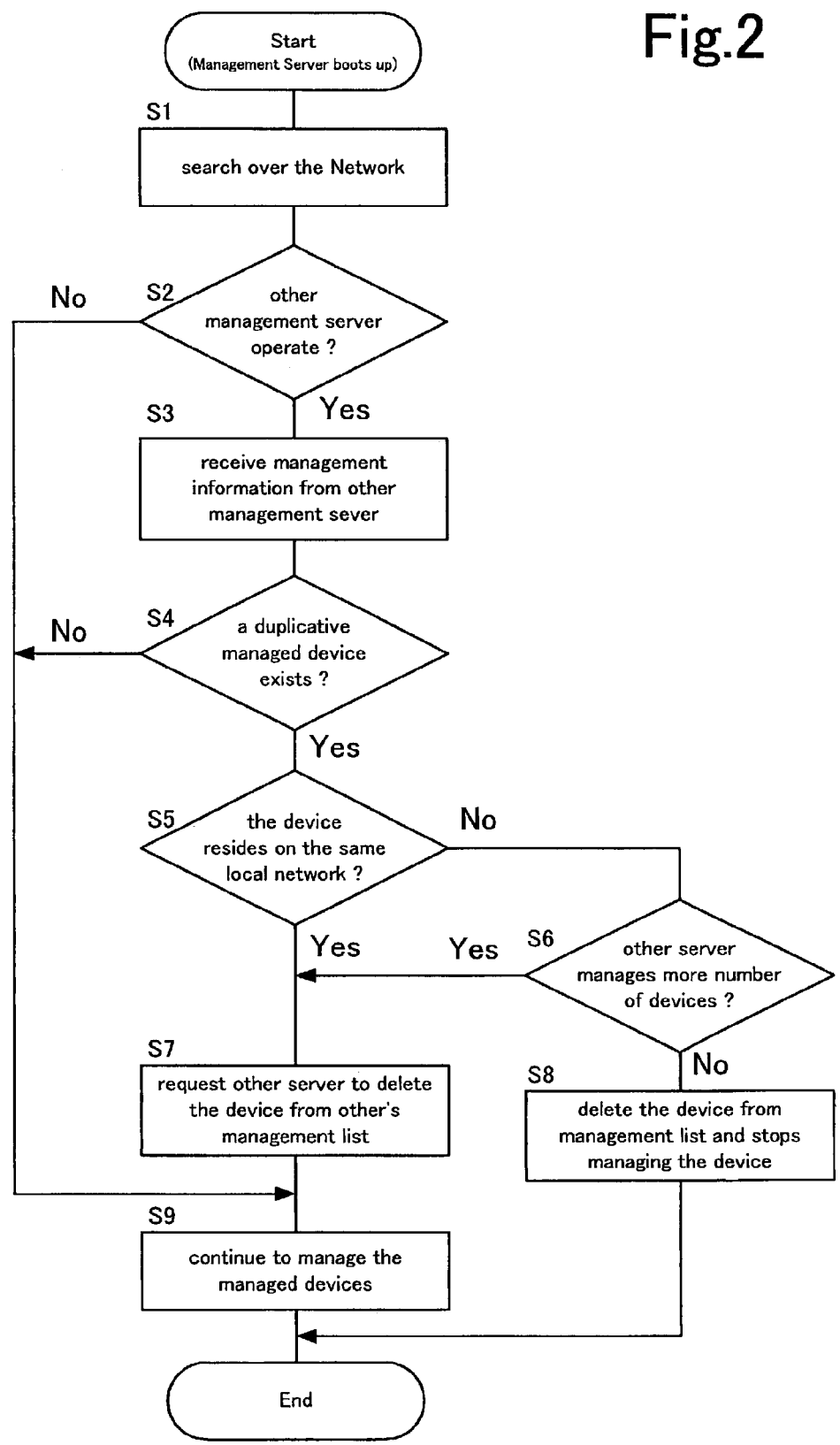
FIG. 2 is a flow chart showing a managing apparatus determination routine.

As shown in FIG. 2, in this managing apparatus determination routine, when a particular management server (hereinafter the 'active management server') is booted, the active management server first performs a search over the network (step S1). The active management server then determines whether or not another management server is operating (step S2). If the active management server does not discover another management server operating (NO in step S2), the active management server continues to manage the managed devices as before (step S9). In the specific example shown in FIG. 1, where the first management server 8 is the active management server, for example, the first management server 8 continues to manage the first through fourth image forming apparatuses 3-6 and the scanner 7.

If, on the other hand, the active management server discovers that another management server (hereinafter a 'passive management server') is operating (YES in step S2), the active management server receives from the passive management server various management information, such as information regarding managed devices or the like, that is stored on the passive management server (step S3). The active management server then determines whether or not a managed device that is subject to duplicative management (hereinafter 'a duplicative managed device') exists between it and the passive management server (step S4). If there is no duplicative managed device (NO in step S4), the active management server continues to manage the managed devices as before (step S9).

On the other hand, if a duplicative managed device does exist (YES in step S4), the active management server determines whether or not the duplicative managed device resides on the same local network as the active management server, i.e., whether or not it is connected to the network via that local network (step S5).

If the duplicative managed device resides on the local area network to which the active management server is connected (YES in step S5), the active management server transmits to the passive management server a notification requesting that the duplicative managed device be deleted from the passive management server's management list (step S7). The active management server then continues to manage the managed devices as before (step S9). In the specific example shown in FIG. 1, where the first management server 8 is the active management server and the second management server 9 is the passive management server, for example, the first management server 8 asks the second management server 9 to delete the third and fourth image forming apparatuses 5 and 6 and the scanner 7, which comprise duplicative managed devices, from the second management server 9's management list, and continues to manage the first through fourth image forming apparatuses 3-6 and the scanner 7.

When the passive management server deletes the duplicative managed devices from its management list, duplicative managed devices no longer exist between the active management server and the passive management server. In other words, all of the managed devices are managed by either the active management server or the passive management server, and none is managed by both management servers in a duplicative fashion.

If, on the other hand, the duplicative managed device does not reside on the local area network to which the active management server is connected (NO in step S5), the active management server determines whether the number of devices managed by the passive management server (hereinafter the 'number of passive management server managed devices') exceeds the number of devices managed by the active management server (hereinafter the 'number of active management server managed devices') (step S6). If the number of passive management server managed devices exceeds the number of active management server managed devices (YES in step S6), because the active management server has more 'room', the active management server manages the duplicative managed devices. In other words, the active management server transmits to the passive management server a notification requesting that the duplicative managed devices be deleted from the passive management server's management list (step S7). The active management server then continues to manage the managed devices as before (step S9).

If the number of passive management server managed devices does not exceed the number of active management server managed devices, however (NO in step S6), because the passive management server has more 'room', the passive management server manages the duplicative managed device. In other words, the active management server deletes the duplicative managed device from its own management list and stops managing the duplicative managed device (step S8). In the specific example shown in FIG. 1, where the first management server 8 is the active management server and the second management server 9 is the passive management server, for example, the first management server 8 deletes the third and fourth image forming apparatuses 5 and 6 and the scanner 7, which comprise the duplicative managed devices, from its own management list. As a result, the third and fourth image forming apparatuses 5 and 6 and the scanner 7 are managed by only the second management server 9.

Consequently, duplicative managed devices no longer exist between the active management server and the passive management server. In other words, all of the managed devices are managed by either the active management server or the passive management server, and none is managed by both management servers in a duplicative fashion.

The processing sequence for the network management range determination routine (network search range determination routine) executed by a particular management server based on the network management program will now be described below with reference to the flow chart of FIG. 3.

Figure 3:
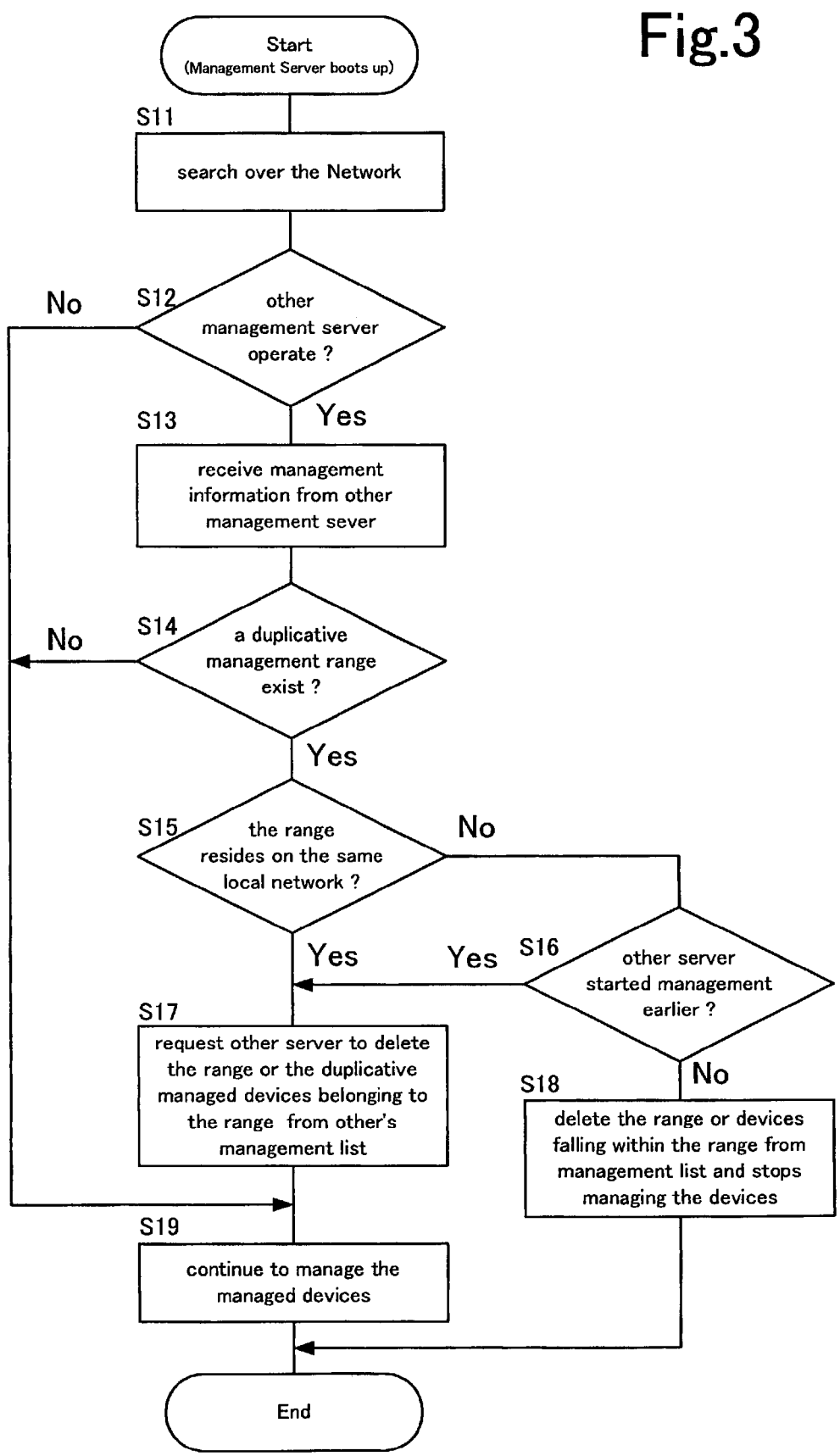
FIG. 3 is a flow chart showing a network management range determination method.

As shown in FIG. 3, in this network management range determination routine, when the active management server is booted, it first performs a search on the network (step S11). The active management server then determines whether or not any other management servers are operating (step S12). If the active management server discovers no other management servers operating (NO in step S12), the active management server continues to manage the managed devices as before (step S19). In the specific example shown in FIG. 1, where the first management server 8 is the active management server, for example, the first management server 8 continues to manage the managed devices having IP addresses falling within the range of (150.17.40.0-255), (150.17.41.0-255), and (150.17.42.0-255).

If, on the other hand, the active management server discovers that another management server, i.e., a passive management server, is operating (YES in step S12), the active management server receives from the passive management server various management information, such as the network management range, that is stored on the passive management server (step S13). The active management server then determines whether or not a network management range that is subject to duplicative management (hereinafter 'a duplicative management range') exists between it and the passive management server (step S14). If a duplicative management range does not exist (NO in step S14), the active management server continues to manage the managed devices as before (step S19).

On the other hand, if a duplicative management range does exist (YES in step S14), the active management server determines whether or not the duplicative management range resides on the same local network as the active management server (step S15). If the duplicative management range does reside on the local area network to which the active management server is connected (YES in step S15), the active management server transmits to the passive management server a notification requesting that this duplicative management range, or the duplicative managed devices belonging to this duplicative management range, be deleted from the passive management server's management list (step S17). The active management server then continues to manage the managed devices as before (step S19).

In the specific example shown in FIG. 1, where the first management server 8 is the active management server and the second management server 9 is the passive management server, for example, the first management server 8 asks the second management server 9 to delete from the second management server 9's management list the managed devices falling within the IP address ranges of (150.17.41.0-255) and (150.17.42.0-255), which are the duplicative management ranges, and continues to manage the managed devices having IP addresses falling within the ranges of (150.17.40.0-255), (150.17.41.0-255), and (150.17.42.0-255).

When the passive management server deletes from its management list each duplicative managed range or each managed device belonging to the duplicative managed range, duplicative managed devices no longer exist between the active management server and the passive management server. In other words, all of the managed devices are managed by either the active management server or the passive management server, and none is managed by both management servers in a duplicative fashion.

If, on the other hand, the duplicative management range does not reside on the local network to which the active management server is connected (NO in step S15), the active management server determines whether the time at which the passive management server began management of the duplicative management range, or of the managed devices falling within the duplicative management range (hereinafter the 'passive management server management commencement time'), was earlier than the time at which the active management server began management of the duplicative management range, or of the managed devices falling within the duplicative management range (hereinafter the 'active management server management commencement time') (step S16). If the passive management server management commencement time was not earlier than the active management server management commencement time (NO in step S16), the active management server manages the managed devices falling within the duplicative management range. In other words, the active management server transmits to the passive management server a notification requesting that the duplicative management range, or the managed devices falling within the duplicative management range, be deleted from the passive management server's management list (step S17). The active management server then continues to manage the managed devices as before (step S19).

If the passive management server management commencement time was earlier than the active management server management commencement time, however (YES in step S16), the passive management server manages the managed devices falling within the duplicative managed range. In other words, the active management server deletes the duplicative management range, or the managed devices falling within the duplicative management range, from its own management list and stops managing these managed devices (step S18). In the specific example shown in FIG. 1, where the first management server 8 is the active management server and the second management server 9 is the passive management server, for example, the first management server 8 deletes from its own management list the managed devices falling within the IP address ranges of (150.17.41.0-255) and (150.17.42.0-255), which are the duplicative management ranges. As a result, the managed devices falling within the IP address ranges of (150.17.41.0-255) and (150.17.42.0-255) are managed by only the second management server 9.

Consequently, duplicative managed devices no longer exist between the active management server and the passive management server. In other words, all of the managed devices are managed by either the active management server or the passive management server, and none is managed by both management servers in a duplicative fashion.

To summarize, in this network management program or network management system, when a particular server, i.e., the active management server, is booted, the network is searched to determined whether another management server is already running. If it is discovered that another management server, i.e., the passive management server, is already running, the active management server receives from the passive management server and stores the address of the passive management server and the network ranges being managed by the passive management server, information listing the managed devices managed by the passive management server, etc.

The active management server that receives this information compares it with the managed network range information and managed device information that is preset in the active management server, and if it finds a range or device that is managed in a duplicative fashion, the active management server deletes such range or device from its own management list. The active management server then sends the passive management server the remaining managed network range information, managed device information, its own address information and the like. It is preferred that the administrator of the management server be notified of the above deletion. Where a user inquires about an apparatus that is outside the management range of the management server, the management server sends the user the other management server's management information that is stored thereon, which enables easier management of the network system. Consequently, duplicative management of any individual managed device by multiple management servers can be prevented, and the user can easily find a desired managed device.

No special function is needed in the managed device in order for the network management program, network management system or network management apparatus described above to operate, and all existing managed devices connected to a network can be covered by such program, system or apparatus, thereby enabling, among other things, a reduction in the burden on the network, effective automatic assignment of multiple managing apparatuses and simpler searching for a managed device.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claim is:

1. A computer-readable recording medium storing a network management program executed in a device for managing a network that includes multiple devices to be managed and plural managing devices, said program causing the device to perform:
   judging whether the plural managing devices are performing duplicative management of the same managed device; and
   causing only one of the plural managing devices to manage the duplicatively managed device.

2. The computer-readable recording medium according to claim 1, wherein the program for managing further causes the device to perform:
   exchanging management information between the plural managing devices; and
   judging in accordance with the exchanged management information.

3. The computer-readable recording medium according to claim 1, wherein the program for managing further causes the device to perform:
   selecting only one of the managing devices connected to the same local area network as that to which the duplicatively managed device is connected ; and
   causing the selected managing device to manage the duplicatively managed device.

4. The computer-readable recording medium according to claim 1, wherein the selected managing device has the earliest management start time for the duplicatively managed device between the start times of the plural managing devices.

5. The computer-readable recording medium according to claim 1, wherein the program for managing further causes the device to perform: selecting from among the plural managing devices the managing device that manages the smallest number of managed devices.

6. The computer-readable recording medium according to claim 2, wherein the management information includes the plural managing devices' own management list.

7. The computer-readable recording medium according to claim 6, wherein the program for managing further causes the device to perform:
   selecting only one of the plural managing devices; and
   requesting that the duplicative managed device be deleted from the other of the plural managing devices' management list.

8. The computer-readable recording medium according to claim 1, wherein the program for managing further causes the device to perform: executing the functions in each one of the plural managing devices when each one of plural managing devices is booted.

9. A computer-readable recording medium storing a network management program executed in a device for managing a network that includes multiple devices to be managed and plural managing devices, said program causing the device to perform:
   judging whether the network management ranges of the plural managing devices overlap; and causing only one of the plural managing devices to manage the overlapping network management range or any managed device belonging to the overlapping network management range.

10. The computer-readable recording medium according to claim 9, wherein the program for managing further causes the device to perform:
exchanging management information between the plural managing devices; and,
judging in accordance with the exchanged management information.

11. The computer-readable recording medium according to claim 9, wherein the program for managing further causes the device to perform: selecting a managing device connected to the same local area network as that to which the overlapping network management range belongs or the managed device belonging to the overlapping network management range is connected as the only one of the plural managing devices.

12. The computer-readable recording medium according to claim 9, wherein the program for managing further causes the device to perform: selecting the managing device having the earliest management start time for the overlapping network management range or any managed device belonging to the overlapping network management range.

13. The computer-readable recording medium according to claim 9, wherein the program for managing further causes the device to perform: selecting from among the plural managing devices the managing device that manages the smallest number of managed devices.

14. The computer-readable recording medium according to claim 10, wherein the management information includes the plural managing devices' own management list.

15. The computer-readable recording medium according to claim 14, wherein the program for managing further causes the device to perform:
selecting only one of said plural managing devices; and
requesting that the duplicatively managed device be deleted from the other of the plural managing devices' management lists.

16. The computer-readable recording medium according to claim 10, wherein the management information includes said plural managing devices' own network management range.

17. The computer-readable recording medium according to claim 16, wherein the causing instruction of the program further causes the device to perform:
selecting only one of said plural managing devices; and
requesting that the overlapping network management range be deleted from the other of the plural managing device's network management range.

18. The computer-readable recording medium according to claim 9, wherein the program for managing further causes the device to perform: executing the steps in each one of the plural managing devices when each one of plural managing devices is booted.

19. A computer-readable recording medium storing a network management program executed in a device for managing a network that includes multiple devices to be managed and plural managing devices, said program causing the device to perform:
managing various managed devices having specific Internet Protocol (IP) addresses for a plurality of network management search ranges;
managing network that includes a plurality of devices to be managed and plural managing devices;
judging whether the network management ranges of the plural managing devices overlap; and
causing only one of the plural managing devices manage the overlapping network management range or any managed device belonging to the overlapping network management range,
wherein at least each separate network management server manages overlapping network search IP addresses.

20. A computer-readable recording medium storing a network management program executed in a device for managing a network that includes multiple devices to be managed and plural managing devices, said program causing the device to perform:
managing various managed devices having specific Internet Protocol (IP) addresses for a plurality of network management search ranges;
managing a network that includes a plurality of devices to be managed and plural managing devices;
judging whether the network management ranges of the plural managing devices overlap; and
making only one of the plural managing devices manage the overlapping network management range or any managed device belonging to the overlapping network management range,
wherein at least each separate network management server manages overlapping network search IP addresses.

21. The computer-readable recording medium according to claim 20, wherein the program for managing further causes the device to perform: managing a first and a second network management server, each of which server manages apparatus comprising a computer that manages managed devices connected to each separate network management device having network search ranges.

22. A network management method comprising:
managing a network that includes multiple devices to be managed and plural managing devices;
judging whether the plural managing devices are performing duplicative management of the same managed device; and
causing only one of the plural managing devices to manage the duplicatively managed device.

23. A computer-readable recording medium storing a network management program executed in a device for managing a network that includes multiple devices to be managed and plural managing devices, said program causing the device to perform:
judging whether the plural managing devices are performing duplicative management of the same managed device;
causing only one of the plural managing devices to manage the duplicatively managed device; and
providing the user with an identification associated with a last-managed device that was being duplicatively managed.

24. A network management apparatus, comprising:
a network that includes multiple devices and plural managing devices,
wherein a unit of the apparatus is for judging whether the plural managing devices are performing duplicative management of the same managed device;
wherein a component of the apparatus is for causing only one of the plural managing devices to manage the duplicatively managed device; and
wherein an identification part of the apparatus is for providing the user with an identification associated with a last-managed device that was being duplicatively managed.

* * * * *